Dec. 8, 1925.                    1,565,046
H. S. BERGDOLL
WINDSHIELD HEATER
Filed April 6, 1925
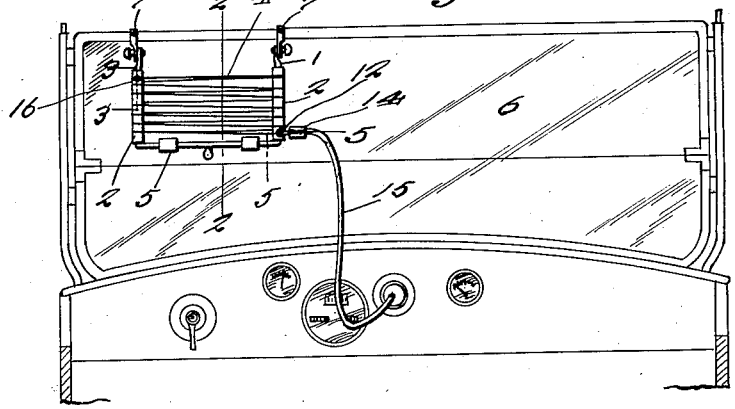
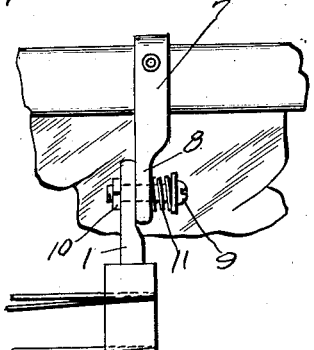
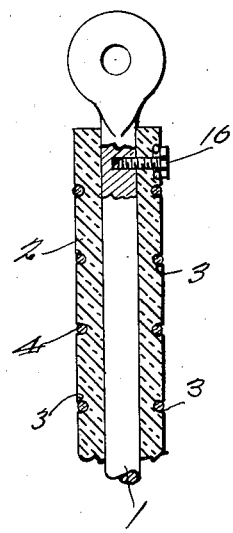
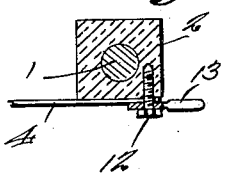
H S Bergdoll  INVENTOR
BY *Victor J. Evans*
ATTORNEY
WITNESS:

Patented Dec. 8, 1925.

1,565,046

UNITED STATES PATENT OFFICE.

HOMER S. BERGDOLL, OF THOMAS, WEST VIRGINIA.

WINDSHIELD HEATER.

Application filed April 6, 1925. Serial No. 21,108.

*To all whom it may concern:*

Be it known that I, HOMER S. BERGDOLL, a citizen of the United States, residing at Thomas, in the county of Tucker and State of West Virginia, have invented new and useful Improvements in Windshield Heaters, of which the following is a specification.

During winter driving it is almost impossible to prevent an accumulation of frost on the windshield of an automobile and windshield wipers are absolutely ineffective in removing such accumulation. It may therefore be considered the object of this invention to provide a simple device for sustaining the windshield of an automobile or like vehicle sufficiently warm to prevent the accumulation of frost, snow or dew thereon and which, at the same time, will not interfere with the clear vision of the driver of the machine.

A further object is the provision of an electrically heated warming device for automobile windshields, that is heated directly from the ignition of the automobile, of a construction to occupy only a comparatively small space on a windshield and likewise of a construction to permit of the driver seeing between the heating coils thereof.

A further object is the provision of a device of this character which will be effectively sustained against the inner face of the windshield but which may be swung and sustained at an upper out-of-the-way position when not desired for use.

To the attainment of the foregoing and other objects which will present themselves as the nature of the invention is better understood, reference is to be had to the drawings which accompany and which form part of this application.

In the drawings:—

Figure 1 is a view looking toward the inner face of the windshield and illustrating the application of my improvement thereon.

Figure 2 is a sectional view approximately on line 2—2 of Figure 1.

Figure 3 is a sectional view on line 3—3 of Figure 1.

Figure 4 is a fragmentary elevation to illustrate the pivotal connection between the heater and its support.

Figure 5 is a sectional view approximately on the line 5—5 of Figure 1.

In carrying out my invention I make use of a substantially U-shaped member that provides the body of the improvement. On the parallel arms 1 of the U-shaped member I arrange rectangular insulators 2. These insulators have their outer faces and their sides notched, as at 3, and received in these notches are the resistance wires 4 that provide the grid of the heater. The connecting element for the U-shaped frame has arranged thereon short tubular compressible members 5 that contact directly with the glass windshield when the device is in operative position.

Secured on the top frame of the windshield 6 there are spaced clips 7, a suitable compressible element being arranged between the U-shaped ends of the said clips and the U-shaped frame. Each of the clips has on its inner end a depending portion that terminates in an eye 8 and these eyes are designed to have received therethrough bolt members 9 which also pass through the flattened faces at the upper or outer ends of the members 1 of the frame. The bolts are engaged by nuts 10, and the headed portions of the said bolts contact with washers against which bear helical springs 11, the said springs also bearing against the eyes 8. In this manner it will be noted that the heater may be effectively sustained in desired positions on its supporting brackets, that is, the heater may be properly brought against the face of the windshield or the same may be swung to an upper position and sustained in either of such positions.

The lower resistance wire of the heater coil or grid has its free end connected to one of the insulators 2 by a bolt member 12. The bolt also secures against the wire a post 13. The post is of metal and is received in a socket 14 connected with a conductor 15. The conductor has its end received in the socket for the light on the instrument board of the automobile. The opposite end wire of the heater is connected by a bolt 16 to the outer arm of the U-shaped frame, and by such arrangement it will be noted that resistance wires are grounded to the metal frame of the windshield and from thence grounded to the frame of the car.

Preferably I provide the corners of the frame with vacuum cups whereby the heater may be readily attached to or detached from the windshield. The heater is, of course, designed for use only in winter and when not required for use may be packed in a box designed for its reception and stored in the tool box, beneath a seat or in any other convenient part of the automobile.

The simplicity of my invention and the advantages thereof, will, it is thought be perfectly apparent to those skilled in the art to which such invention relates but it is to be understood that I do not wish to be restricted to the details of construction herein set forth and hold myself entitled to such changes therefrom as fairly fall within the scope of what I claim.

Having described the invention, I claim:—

1. An electric warming device for the windshields of automobiles or like vehicles, including brackets fixed to the metal frame of the windshield, a substantially U-shaped frame having its arms pivotally secured to the brackets, insulators on the parallel arms of the frame, a resistance wire trained around the insulators, a metal connection between one end of said wire and one arm of the frame and a post for a conductor on the second end of the resistance wire.

2. An electric warming device for the windshields of automobiles or like vehicles, including brackets fixed to the metal frame of the windshield, a substantially U-shaped frame having its arms pivotally secured to the brackets, insulators on the parallel arms of the frame, a resistance wire trained around the insulators, a metal connection between one end of said wire and one arm of the frame, a post for a conductor on the second end of the resistance wire and buffer members on the connecting element of the U-shaped frame.

3. An electric warming device for the windshields of automobiles or like vehicles, including brackets fixed to the metal frame of the windshield, a substantially U-shaped frame having its arms pivotally secured to the brackets, insulators on the parallel arms of the frame, a resistance wire trained around the insulators, a metal connection between one end of said wire and one arm of the frame, a post for a conductor on the second end of the resistance wire, buffer members on the connecting element of the U-shaped frame and spring means associated with the pivots between the bracket and frame for sustaining the frame against the windshield or away therefrom.

In testimony whereof I affix my signature.

HOMER S. BERGDOLL.